United States Patent [19]

Nord

[11] Patent Number: 4,676,281

[45] Date of Patent: Jun. 30, 1987

[54] ARRANGEMENT IN REMOVABLE LIQUID CONTAINERS AND A METHOD OF REMOVING SAME

[76] Inventor: Runo Nord, Dalavägen 9, S-826 00 Söderhamn, Sweden

[21] Appl. No.: 847,657

[22] PCT Filed: Jun. 14, 1985

[86] PCT No.: PCT/SE85/00252
§ 371 Date: Feb. 14, 1986
§ 102(e) Date: Feb. 14, 1986

[87] PCT Pub. No.: WO86/00373
PCT Pub. Date: Jan. 16, 1986

[30] Foreign Application Priority Data

Jun. 21, 1984 [SE] Sweden ............................ 8403344

[51] Int. Cl.$^4$ ........................... B65B 3/04; B67C 9/00
[52] U.S. Cl. ......................................... 141/1; 141/65; 141/98; 141/115; 141/330; 184/1.5; 184/106; 123/198 R
[58] Field of Search ....................... 141/19, 329, 330, 1, 141/98, 86, 115–127, 65; 184/1.5, 106; 123/198 R, 198 P

[56] References Cited

U.S. PATENT DOCUMENTS

| | | | |
|---|---|---|---|
| 1,657,782 | 1/1928 | Berg | 141/330 |
| 2,002,611 | 5/1935 | Nall | 141/330 |
| 2,774,393 | 12/1956 | Swan | 141/330 |
| 3,333,735 | 8/1967 | Odasso | 141/330 |

*Primary Examiner*—Houston S. Bell, Jr.
*Attorney, Agent, or Firm*—Larson and Taylor

[57] ABSTRACT

A removable filter container for use with a liquid system, and a method of removing the filter. A first container which houses the filter is removably attached to a main compartment of the liquid system. A second container which is normally empty is attached thereto. A manually operated punching tool connected to the second container punches a hole in the first container to cause liquid to flow from the first container through the punched hole and into the second container, lowering the level of liquid in the first container to prevent overflow of the liquid therein when removing the first container from the liquid system.

13 Claims, 5 Drawing Figures

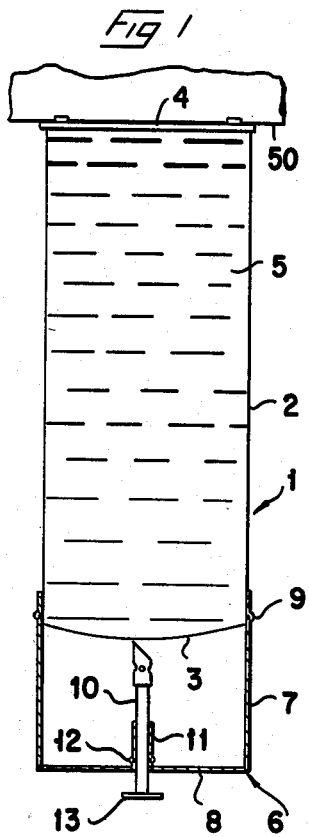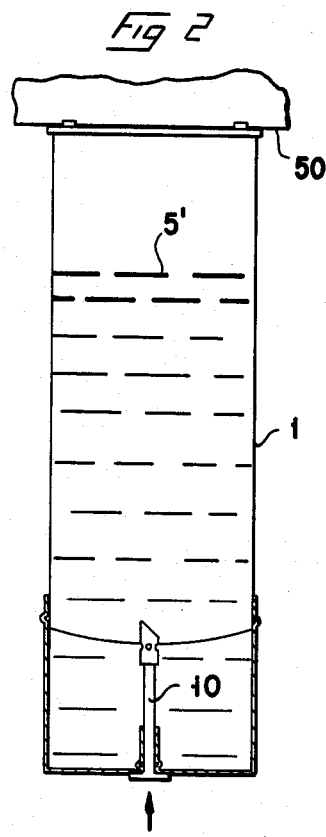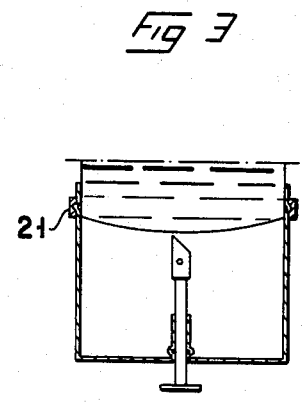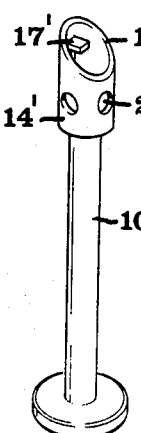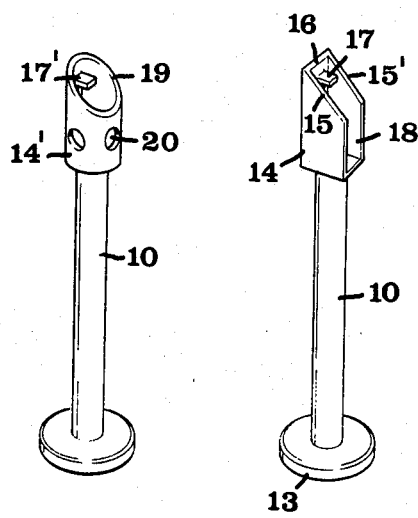

ARRANGEMENT IN REMOVABLE LIQUID CONTAINERS AND A METHOD OF REMOVING SAME

BACKGROUND OF THE INVENTION

Oil filters of the kind which in addition to a filter part includes a cylindrical, often oblong container, are used for purifying the oil in engines of various types, e.g. diesel or petrol engines for trucks or the like. Such filters are at one of their ends provided with a threaded opening by means of which the container can be screwed into a connection to the lubrication system of the engine. When the oil in this system is changed the system is emptied through a plug or otherwise, for instance as disclosed in the Swedish patent application No. 8303510-5. The filter remains however filled with oil and if the filter also is to be changed in connection with the oil change, this can result in considerable difficulties when the filter is removed, which is normally done manually. Thus the oil runs over the edge and down the side of the filter container which causes the operator to lose his grip and to soil his hands with oil. The task of removing the filter is thus on one hand difficult to carry out in a convenient way and on the other hand harmful in so far that a repeated contact with oil, especially used oil, is harmful from a medical point of view.

BRIEF DESCRIPTION OF THE INVENTION

The present invention provides an arrangement and a method which removes the above-mentioned drawbacks and make possible a convenient quick and clean change of oil filter containers. According to the main features of the invention these and other objects are achieved in that to said container is associated a second container that is substantially empty when said first container is in a filled condition, and that a hole punching tool is arranged to make possible the opening of a draining hole in the first container before removal thereof so as to drain liquid from said first container to said second container whilst lowering the liquid level in said first container.

BRIEF DESCRIPTION OF THE ATTACHED DRAWINGS

In the drawings

FIG. 1 is a simplified section through an oil filter made in accordance with the invention and shown in a state of use, FIG. 2 is a similar section showing the filter in connection with the removal thereof, FIG. 3 is a partial section of a filter according to an alternative embodiment and FIGS. 4 and 5 are perspective views showing two different embodiments of a hole punching tool.

DETAILED DESCRIPTION OF A PREFERRED EMBODIMENT OF THE INVENTION

Throughout the drawings 1 generally denotes a conventional oil filter in the form of a container which includes a cylindrical wall 2 as well as a bottom 3. In the end part 4 being opposite to the bottom there is an opening with a thread (not shown) for screwing the filter container into the connection of the main compartment 50, shown here as a lubrication system of an engine. The container also includes a filter part (not shown) for filtering the oil passing through the container. As shown in FIG. 1 the container is normally entirely filled with oil 5 when connected to and forming a part of said lubrication system.

In accordance with the basic idea of the invention a second container generally denoted 6 is associated to the filter container 1, said second container in this case being mounted to the bottom end of the container 1 and extending in extension thereof. Thus the container 6 too includes a cylindrical wall 7 as well as a bottom wall 8, said cylindrical wall 7 being fitted onto the outer side of the container 1 and in a suitable manner sealingly connected thereto e.g. by means of a sealing ring 9.

To make it possible to make a hole in the bottom wall 3 of the container 1 a hole punching tool associated to the second container 6 and in the form of a striking pin 10 is mounted in a sleeve extending inwardly from the bottom 8, a sealing ring 12 being connected to said sleeve in order to seal the area between the inside of the sleeve and the outside of the striking pin. Advantageously the pin 10 on its free end protruding from the container 6 is provided with an actuating means, which here takes the form of a plate 13 against which e.g. a hammer can be struck.

Reference is now made to FIGS. 4 and 5 which illustrate two embodiments of the said striking pin. In the embodiment according to FIG. 4, the pin at its striking end is provided with a box 14 being U-shaped in section and having two cutting edges 15,15' which extend obliquely backwards from a frontal edge portion 16. At some distance behind the edge portion 16 as seen in the direction of movement there is an abutment 17 serving as driver. When the box 14 is forced into the bottom 3 of the container 1 the edge portion 16 together with the cutting edges 15,15' will cut out a U-shaped tab in the bottom wall. When this tab is engaged by the abutment 17 the tab will be carried along and swung into the container while forming a substantially rectangular opening in the bottom wall 3, the oil in the container 1 being able of flowing through the opening and the lateral opening 18 in the box 14.

In the embodiment according to FIG. 5 the box 14 is substituted for a short tube piece 14' having an obliquely cut oval cutting edge 19 and a carrier abutment 17'. In the tube piece 14' one or more drainage openings 20 are cut out. In this case a circular tab will be cut out in the bottom wall 3. Said tab will be safely swung sidewards by means of the abutment 17' while reliably forming a drainage opening in the bottom wall 3.

In FIG. 3 an embodiment is shown where the cylindrical wall 7 of the container 6 has been provided with a clamping ring 21 that exceptionally reliably holds the container 6 to the filter container 1.

THE METHOD OF OPERATION OF THE INVENTION

In FIG. 1 the filter container is connected to said lubrication system and thus filled with oil 5. The striking pin 10 is here in an inoperative position out of contact with the bottom wall 3.

When the filter is to be changed the lubrication system of the engine in question is first emptied. Both the container 1 and its connection to the engine will however remain filled with oil. To avoid that this oil flows over the edge of the container the pin 10 is forced into and through the bottom wall 3 in the manner shown in FIG. 2, an opening being formed in the bottom wall through which opening oil from the container 1 can flow into the container 6 while lowering the oil level 5' considerably below the upper edge of the container 1. After this, the container 1 can be unscrewed without any risk that the oil overflows and flows down the outside of the container. In other words, the filter change can be carried out in a clean and convenient way without risking that the operator loses his grip of the container or soils his hands.

I claim:

1. A removable filter for use with a liquid system comprising:
    a first container normally operatively connected to a main compartment of a liquid system, and, in use, containing a portion of the liquid of such system, and including means for being attached to such main compartment,
    a second container attached to said first container and normally substantially empty and blocked from liquid communication with the interior of the first container,
    a hole punching tool operatively connected to the second container, said punching tool having a punching means for punching a hole in the first container and an actuating means accessible from the exterior of the second container for causing the punching means to punch a hole in the first container, upon actuation thereof, to permit some liquid to drain from the first container to the second container to lower the level of the liquid in the first container to prevent overflow of the liquid from the first container when disconnecting and removing it from such main compartment.

2. A removable filter according to claim 1, said second container attached to a closed end of the first container, and said punching means formed on one end of a striking pin, the other end of which is a striking surface which constitutes said actuating means.

3. A removable filter according to claim 1, said punching tool having an oblique cutting edge arranged to cut out a tab portion in the wall of the first container, a tab driver fixed on the punching tool just behind said cutting edge, such tab driver arranged to engage the tab portion of the wall being cut out by the cutting edge and push said tab portion out of the way to facilitate drainage of liquid from the first container to the second container.

4. A removable filter according to claim 3, said oblique cutting edge being O-shaped.

5. A removable filter according to claim 3, said oblique cutting edge being U-shaped.

6. A liquid containing system comprising a main compartment for containing the liquid of the system, a removable container removably connected to the bottom of the main compartment, said removable container opening at its top into said main compartment and normally containing the liquid of the system, a second container connected to the bottom of the said removable container, said second container being substantially empty during normal operation of the liquid system and out of liquid communication with the interior of the removable container, said second container having a volume sufficiently great to hold a portion of the liquid of the removable container, a punching tool mounted in the second container and having an actuating portion accessible to be manually operated from a location outside of said second container, said punching tool having a punching means for punching a hole in said removable container, upon actuation of said accessible actuating means, for draining a portion of the liquid from the removable container into the second container,
    whereby when the removable container is removed from a previously substantially emptied main compartment, the liquid level of the removable compartment will be reduced by the portion thereof which drained into the second compartment, so as to prevent overflow of the liquid during removal of the removable container.

7. The system of claim 6, wherein the said removable container contains a filter for filtering the liquid of the system.

8. The system of claim 7, wherein the main compartment in an automobile engine oil compartment.

9. The system of claim 6, wherein the second container is attached to the bottom of the removable container, and said punching tool is formed in the upper end of a pin, the bottom of which is the actuating portion which is accessible from beneath the second container.

10. The system of claim 6, said punching tool having an oblique cutting edge arranged to cut out a tab portion in the wall of the removable container, a tab driver fixed on the punching tool just behind said cutting edge, said tab driver arranged to engage the tab portion and push said tab portion out of the way to facilitate drainage of liquid from the removable container to the second container.

11. A system of claim 10, wherein said oblique cutting edge is O-shaped.

12. The system of claim 10, wherein said oblique cutting edge is U-shaped.

13. A method of removing a removable filter container from the main compartment of a liquid system of the type wherein the filter container is mounted onto the bottom of the main compartment and includes the liquid of the system, comprising the steps of:
    removing substantially all liquid from the main compartment,
    punching a hole in the filter container and draining a portion of the liquid still contained therein into a second container fixed onto the bottom of the filter container, and
    after the liquid level in the filter container has been reduced by the volume drained into the second container, removing the filter container from the main compartment.

* * * * *